Figure 1:
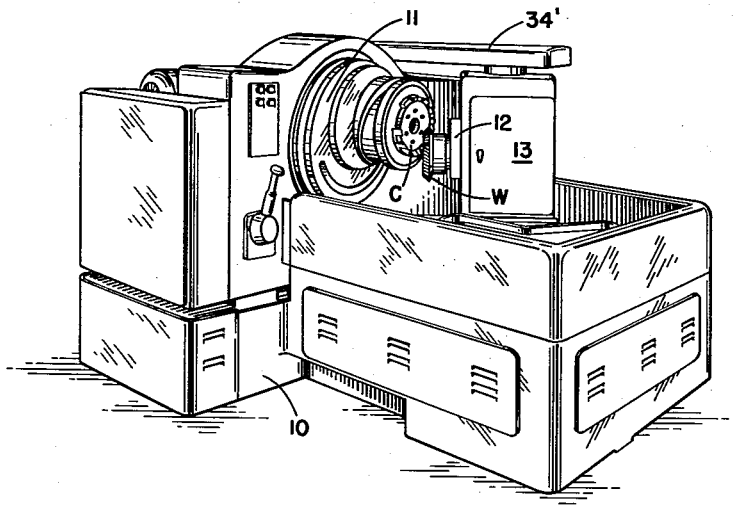

Feb. 28, 1961

L. O. CARLSEN 2,972,912

GEAR CUTTING MACHINE WITH WORK
SPINDLE POSITIONING MEANS

Filed Nov. 22, 1957

2 Sheets-Sheet 1

INVENTOR.
LEONARD O. CARLSEN
BY
*Richard W. Treverton*
ATTORNEY

Feb. 28, 1961

L. O. CARLSEN 2,972,912

GEAR CUTTING MACHINE WITH WORK SPINDLE POSITIONING MEANS

Filed Nov. 22, 1957

2 Sheets-Sheet 2

United States Patent Office 2,972,912
Patented Feb. 28, 1961

2,972,912
GEAR CUTTING MACHINE WITH WORK SPINDLE POSITIONING MEANS

Leonard O. Carlsen, Rochester, N.Y., assignor to The Gleason Works, Rochester, N.Y., a corporation of New York Filed Nov. 22, 1957, Ser. No. 698,111

11 Claims. (Cl. 74—813)

The present invention relates to machines for cutting bevel gears and the like, and especially to such machines of the intermittent indexing type which are adapted for form cutting as well as for cutting by the rolling generating method.

In such machines the cutter is carried by a rotatable cradle which is connected to a rotatable work spindle by a generating drive train. In order to make the machines adjustable to accommodate work gears of different designs, the generating train is necessarily long, comprising a number of shafts and gears. The intermittent motion of the work spindle needed to bring successive teeth of the work into cutting position is produced by an indexing mechanism whose motion is introduced into the generating train through a differential gear set. In order to avoid duplication of shafting the index mechanism must be located near the cradle end of the drive train and remote from the work spindle end thereof.

When operating by the non-generating or form cutting method, the cradle is locked and the work spindle is rotated only intermittently by the index mechanism. Because of the inherent resiliency of the long drive train, and the necessity of employing a drag brake on the work spindle to eliminate backlash in the train, a spring wind-up develops in the train during each indexing operation. This wind-up is relieved at the conclusion of the indexing, to an extent which is subject to random variation leading to tooth spacing errors in the finished non-generated gears. This problem has existed for many years despite attempts to overcome it by various means including the provision of heavier shafting in the drive train and the application of different amounts of braking effort to the work spindle.

The present invention overcomes the difficulty by providing a pressure-exerting device which acts on a shaft in the drive train near the work spindle, to accurately position the shaft in a predetermined angular relation to a non-rotating part of the machine at the conclusion of each indexing operation. The device comprises a cam on the shaft and a spring-backed drive pawl which is carried by the non-rotating part and acts to drive the cam to the same position after every indexing. Preferably a drag brake is associated with the work spindle to eliminate backlash between such shaft and the work spindle. Also means are preferably provided to clamp the work spindle against motion while cutting is taking place.

Figure 2:
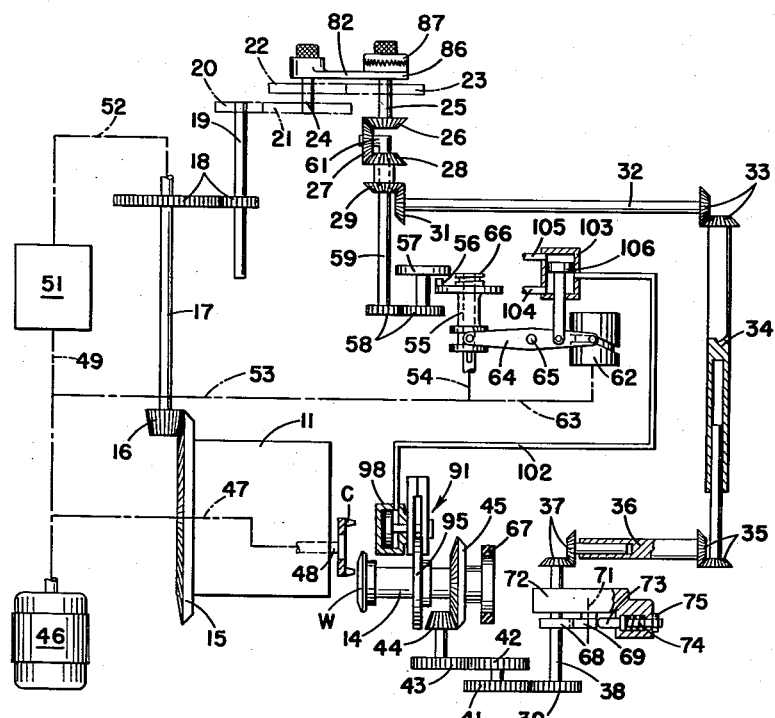
Figure 3:
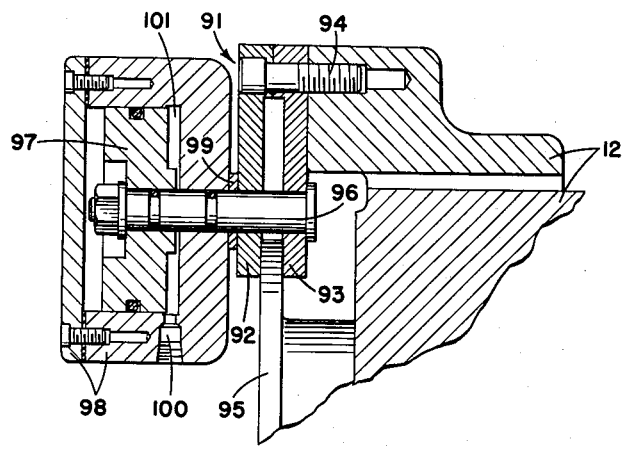
Figure 4:
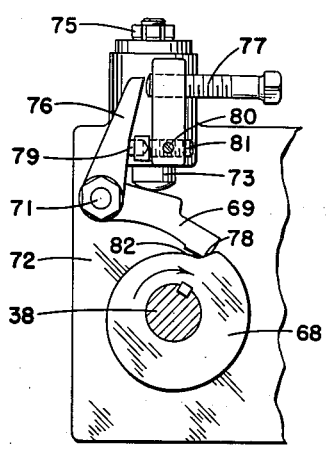
Figure 5:
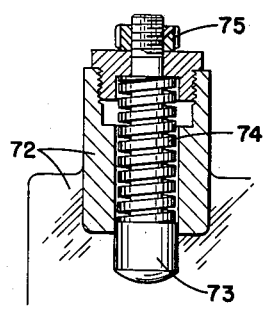
Figure 6:
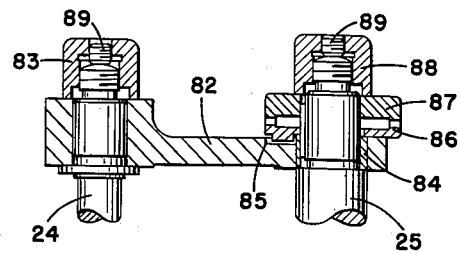

A preferred embodiment of the invention will now be described in detail with reference to the accompanying drawings, wherein:

Fig. 1 is a perspective view of the machine;
Fig. 2 is a drive diagram of the machine;
Fig. 3 is a sectional view through the work spindle clamp;
Fig. 4 is a side elevation of the pressure-exerting device comprising the cam and drive pawl;
Fig. 5 is a sectional view showing the backing spring for the pawl; and
Fig. 6 is a sectional view of a device for adjusting the angular relationship between the cam and the indexing mechanism.

As shown in Fig. 1 the machine includes a frame 10 on which a cradle 11 is rotatable about a horizontal axis, the cradle carrying a face mill cutter C for cutting the teeth of a workpiece W mounted on a horizontal work spindle journaled in a work head 12. This head is adjustable vertically on a column 13 which is adjustable on the frame 10 in the direction of the cradle axis and also angularly about a vertical axis which intersects the cradle axis.

As shown in Fig. 2 the generating drive train, connecting the cradle 11 and the work spindle 14, comprises a ring gear 15 on the cradle, a hypoid pinion 16 meshing with gear 15, shaft 17, gears 18, shaft 19, ratio-of-roll change gears 20, 21, 22, 23 of which gears 21 and 22 are keyed to a shaft 24, shaft 25, a differential gear set comprising bevel gears 26, 27 and 28, bevel gear 29 integral with gear 28, bevel gear 31, shaft 32, bevel gears 33, telescoping shaft 34, bevel gears 35, telescoping shaft 36, bevel gears 37, shaft 38, index change gears 39, 41, 42 and 43, hypoid pinion gear 44, and gear 45 on spindle 14. Shaft 32 is vertical and is located in the cradle housing portion of the frame 10, while the shaft 34 (within housing 34' in Fig. 1) is horizontal and, because it is telescoping, permits the above-mentioned adjustments of column 13. Shaft 36 is vertical and its upper and lower ends are journaled for rotation respectively in column 13 and work head 12, its telescoping character enabling the afore-mentioned vertical adjustment of the work head.

A motor 46 drives the cutter through a train of gearing and shafting which is indicated schematically at 47 and includes the cutter spindle 48 journaled in cradle 11. Through another gear train 49 the motor drives a reversing mechanism 51 which through a suitable gear train 52 rotates the shaft 17 first in one direction and then in the other, to thereby roll the cradle 11 and the work spindle 14 alternately back and forth when gears are being produced by the generting method. Intermittent indexing of the workpiece usually takes place during the non-cutting return roll of the cradle and work spindle. Such indexing is effected by the motor 46 driving through a gear train 53, 54, a Geneva movement comprising a constantly rotating driver 55 having a drive pin 56 and an intermittently rotated and slotted driven member 57, gears 58 and shaft 59 which has a carrier 61 for planet gear 27 of the differential gear set. A cam 62, also driven by motor 46, through a gear train 53, 63, acts by means of a lever 64 fulcrumed at 65 to shift the Geneva driver 55 axially into and out of operative relation to driven member 57. When brought into operative relation the pin 56 engages a slot in the driven member 57 to drive the member 57. This motion is introduced into the generating train through the differential gear set, to thereby index the work spindle. When the index driven member 57 is not being rotated by the driver 55, 56, it is locked against rotation relative to the frame 10 by a spring-backed lock dog, not shown. A cam 66 co-rotatable with the driver 55 releases the lock dog to permit indexing to take place.

A friction brake 67 acting on the work spindle 14 serves to take up backlash in the part of the generating train that connects shaft 17 to the work spindle.

When the machine is used to cut gears by a non-generating or form cutting method the drive 49 for the reversing mechanism 51 is disconnected, the cradle 11 is clamped against rotation in the frame 10, and the change gears 20—23 are replaced by a yoke which holds shaft 25 against rotation. As a result, the only rotation of work spindle 14 is that arising from the intermittent rotation of index driven member 57. Such indexing may be timed to take place when a gap between the last and first blades of the cutter C is abreast of the work. Or, in cases where the work is fed into the cutter by feed motion of the work head and column 13 relative to the frame, the indexing may occur when the work is withdrawn from the cutter at the conclusion of each infeed. The infeed and withdrawal motions are effected by a cam, not shown, arranged to operate in time with cam 62.

According to the present invention a cam 68 is secured to shaft 38, this being the shaft, nearest in the generating train to the work spindle, which makes one or more integral turns during each operation of the index. Shaft 38 is located just ahead of the index change gears 39, 41, 42, 43, and, in the embodiment illustrated, makes two turns for each index operation, the index driven member 57 making one-half turn, the shaft 59 one turn, and the gear and shaft elements 28—38 two turns. A drive pawl 69 for the cam 68 is pivoted at 71 to a part 72 that is stationary relative to the head 12. A plunger 73 backed by a pre-loaded coil spring 74 is carried by part 72 and acts to press the pawl against the cam. The motion of the plunger is limited by a stop nut 75 which, when once adjusted, is pinned to the plunger. An arm 76 rigid with the pawl is adapted to be engaged by a screw 77 which is screw-threaded to part 72 and may be screwed in to lift the pawl clear of the cam. The action of the pawl is to engage the steeply inclined rise 78 of the cam with spring pressure and move the cam clockwise in Fig. 4 to the position shown, determined by the abutment of stop nut 75. A nylon buffer 79 carried by a screw 81 serves to prevent noise-producing impact of the pawl 69 with the part 82 of the cam at the bottom of rise 78 under circumstances to be described hereinafter. The screw 81 after being adjusted is secured by a set screw 80.

The cam 68 is adjusted angularly, relative to the index driven member 57, so that at the conclusion of indexing the cam will stop just short of the position shown, whereby the final increment of motion of the cam will be imparted to it by the pawl 69 as the latter moves to its limit position determined by stop 75. During each indexing operation the drag of spindle 14, especially as a result of the action of brake 67, causes a certain amount of spring wind-up of shafts 59, 32, 34, 36 and 38, and also, perhaps, slight spring deflection of the gears associated with these shafts, so that after the index driven member 57 includes its motion, and is locked by the lock dog associated with it, this spring wind-up is released to some degree, driving the shaft 38 ahead. The action of the pawl 69 against cam 68 assures such final advance of shaft 38 being to the same position on every indexing cycle, preferably to the position wherein the aforementioned spring deflection of the drive train is fully or almost fully released. During the subsequent indexing action the cam rotates clockwise, in Fig. 4, the pawl following idly but, for the large part of each revolution of the cam, being pressed against the cam surface by the spring 74. Since the cam makes two turns for each indexing, and since the came is moving rapidly at the conclusion of the first such turn, the spring acts at that time to snap the pawl downwardly as soon as the rise 78 has passed. The nylon buffer arrests such motion of the pawl, preventing hammer action of the pawl against bottom surface 82 of the cam.

The angular adjustment of the cam 68 is effected by the device shown in Fig. 6 which replaces the change gears 20—23 and serves to clamp the shaft 25. It comprises a yoke 82 which is secured on the shaft 24 by a nut 83. The yoke carries a bushing 84 for rotatably receiving the shaft 25 and a keyway 85 for receiving the key of a fine-division face clutch member 86 in which shaft 25 is also rotatable. A mating clutch member, 87, is keyed to shaft 25 and is held thereon by a nut 88. In the particular embodiment illustrated, each clutch member has one hundred twenty teeth. The nuts 83 and 88 after being tightened may be locked by set screws 89. The cam 68 may be adjusted angularly relative to the index driven member 57 by loosening the nut 88, disengaging clutch members 86, 87, and then turning shaft 25, to thereby impart motion through the differential gear set to the gear train 29—38. One procedure found suitable for making this adjustment on the particular machine illustrated is as follows: Stop nut 75 is so adjusted that spring plunger 73 will move the pawl 69 only to the position shown, in which it is spaced from the surface 82 of the cam at the bottom of rise 78, and screw 81 supporting nylon buffer 79 is adjusted to hold the pawl firmly against the plunger. The machine is operated through one indexing cycle, stopping it as soon as the index driven member is locked up by its lock dog. Clutch members 87, 86 are disengaged and shaft 25 is turned to rotate cam 68 counterclockwise (in Fig. 4) until rise 78 abuts the pawl firmly but with insufficient pressure to further compress spring 74. The clutch members are re-engaged. Screw 77 is turned in to lift the pawl 69 clear of the highest position of the cam. The clutch members 87, 86 are disengaged and member 87 is advanced by one tooth relative to member 86 in a direction to rotate the cam counterclockwise in Fig. 4. The screw 77 is backed off until it is clear of arm 76.

It has been explained that the action of pawl 69 against cam 68 is to accurately position shaft 38 at the conclusion of each indexing operation. The friction brake 67 imposes a drag on the work spindle sufficient to eliminate backklash in the change gears 39, 41, 42, 43 and the final reduction gears 44, 45, with the result that the work spindle also is accurately positioned at the conclusion of each indexing by the action of the pawl against the cam. In order to maintain this position while tooth cutting is taking place a work spindle clamp 91, Figs. 2 and 3, is provided.

This clamp comprises a pair of plates 92, 93, each of substantially rectangular shape, secured to work head 12 by screws, one of which is shown at 94. The plates lie on opposite sides of an annular flange 95 on the work spindle 14. Extending slidably through the plates is a headed clamp-actuating pin 96 carrying a piston 97. The piston is reciprocable in a cylinder 98 which is slidably supported by the pin and is separated from plate 92 by a washer 99. The cylinder has a pipe-threaded inlet passage 100 leading into the cylinder chamber 101 nearest the shoe 92. A conduit 102, Fig. 2, connected to this passage, communicates through a valve 103 with either the pressure line 104 or the return line 105 of an auxiliary hydraulic system of the machine. The valve has a sliding piston 106 operatively connected to lever 64 of the index mechanism. The arrangement is such that when the lever is in the position shown, in which the index drive member 55, 56 is disengaged from the index driven member, the pressure line 104 is connected to cylinder chamber 101; and that when the lever is in its opposite position, wherein the index drive and driven members are engageable, the cylinder chamber is connected to exhaust line 105. This means that during the part of the machine cycle when the index is idle, which is the period when cutting takes place, the piston 97 and pin 96 are urged to the left (in Figs. 2 and 3) and the cylinder 98 to the right, to thereby draw the shoes 92, 93 together to clamp the work spindle flange 95 to the stationary work head 12. During the indexing phase of the machine cycle, the chamber 101 is on exhaust, and the inherent resilience of the shoes 92, 93 frees them from the spindle flange sufficiently to allow the spindle to rotate.

When the machine is to be operated to cut gears by the generating method the clamp 91 is disabled, as for example by disconnecting the line 104 from the pump or other source of hydraulic pressure; the pawl 69 is drawn clear of cam 68 by turning in the screw 77; and the yoke 82 and clutch members 86, 87 are replaced by suitable ratio-of-roll change gears 20—23.

Having now described the preferred embodiment of my invention, and its mode of operation, what I claim is:

1. A machine for cutting gears and the like, having a work spindle driven by an intermittent indexing mechanism through a drive train comprising a plurality of shafts connected by gears, said indexing mechanism including an intermittently driven member connected to said train for driving the same and a means for holding said member against rotation when it is not being driven, one such shaft remote from said mechanism and adjacent the work spindle being rotatable through a predetermined angle during each indexing operation, the machine being characterized by having a device for angularly positioning said shaft in predetermined relation to a non-rotating part of the machine at the conclusion of every indexing operation.

2. A machine according to claim 1 in which said device comprises a cam on said shaft, a drive pawl for said cam carried by said non-rotating part, and a pressure-exerting means for moving said pawl into a definite position of engagement with said cam to thereby rotate the shaft into a definite position relative to said non-rotating part.

3. A machine according to claim 2 in which said shaft is arranged to be advanced by one or more integral turns during each indexing operation, and said cam has a single pawl-engaging rise for controlling the positioning of the shaft.

4. A machine according to claim 1 having index change gears in said drive train between said shaft and the work spindle, and means to eliminate backlash between said shaft and the work spindle.

5. A machine according to claim 4 in which said means to eliminate backlash comprises a drag brake on the work spindle.

6. A machine according to claim 1 in which there is a clamp for holding the work spindle against rotation while the machine is cutting, and means operating in time with said index mechanism for periodically releasing the clamp to permit indexing of the work spindle and operation of the shaft-positioning device.

7. A machine for cutting gears and the like, having a work spindle driven by an intermittent indexing mechanism through a drive train comprising a plurality of shafts connected by gears, said indexing mechanism including an intermittently driven member connected to said train for driving the same and a means for holding said member against rotation when it is not being driven, the drive train including index change gears, one such shaft remote from said mechanism and adjacent the work spindle, and located between said mechanism and said change gears, being arranged to rotate by one or more integral turns during each indexing operation, a cam on said shaft, a positioning drive pawl for said cam carried by a non-rotating part of the machine, and pressure exerting means for moving said pawl into engagement with said cam to thereby position the shaft in predetermined angular relation to said non-rotating part.

8. A machine according to claim 7 in which there is a drag brake for the work spindle, a clamp for holding the work spindle against rotation, and means operating in time with said mechanism for releasing the clamp to permit indexing and movement of the cam by the drive pawl.

9. A machine according to claim 7 in which there is an adjusting means to adjust the angular relationship between the indexing mechanism and said cam.

10. A machine according to claim 9 in which the adjusting means comprises a differential gear set in said drive train and a toothed clutch to adjust one rotating element of said gear set relative to a non-rotatable part of the machine.

11. A machine for cutting gears and the like comprising a frame, a work spindle, a work head journaling the spindle and movable on the frame, an intermittent indexing mechanism supported by the frame and having an intermittently driven member connected with the spindle by a drive train including relatively movable elements arranged to accommodate movement of the head on the frame, said indexing mechanism including a means for holding said driven member against rotation when it is not being driven, said train including a shaft journaled in the head and geared to the work spindle, said train being adapted to drive said shaft through an integral number of turns during each operation of the indexing mechanism, a cam on said shaft, and a pawl carried by the head and held against the cam under pressure, the cam and pawl being arranged to stop the shaft in predetermined positional relation to the head at the conclusion of each turn of the shaft.

References Cited in the file of this patent

UNITED STATES PATENTS

| | | |
|---|---|---|
| 2,188,996 | Carlsen | Feb. 6, 1940 |
| 2,355,457 | Mares | Aug. 8, 1944 |
| 2,392,228 | Casella et al. | Jan. 1, 1946 |
| 2,635,326 | Godfriaux et al. | Apr. 21, 1953 |
| 2,777,336 | Schonstedt | Jan. 15, 1957 |
| 2,794,103 | Moore et al. | May 28, 1957 |
| 2,831,374 | Fowler et al. | Apr. 22, 1958 |

FOREIGN PATENTS

| | | |
|---|---|---|
| 497,331 | Great Britain | Dec. 21, 1938 |